Aug. 29, 1950 — C. W. THORNHILL — 2,520,864
CLOSURE FOR PRESSURE VESSELS
Filed May 29, 1945 — 2 Sheets-Sheet 1

CHARLES W. THORNHILL,
INVENTOR.
BY
ATTORNEYS

Aug. 29, 1950 C. W. THORNHILL 2,520,864
CLOSURE FOR PRESSURE VESSELS
Filed May 29, 1945 2 Sheets-Sheet 2
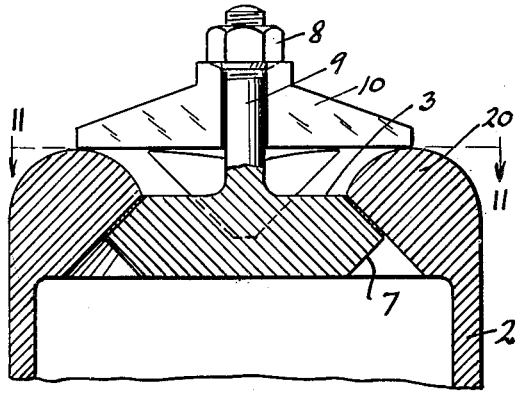
Fig. 10.
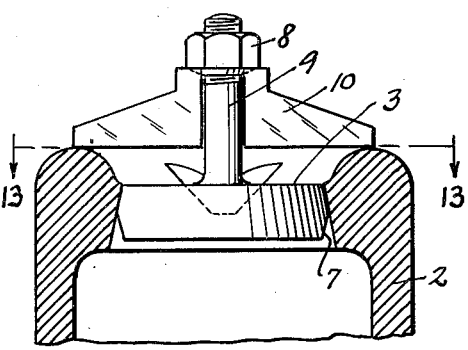
Fig. 12.
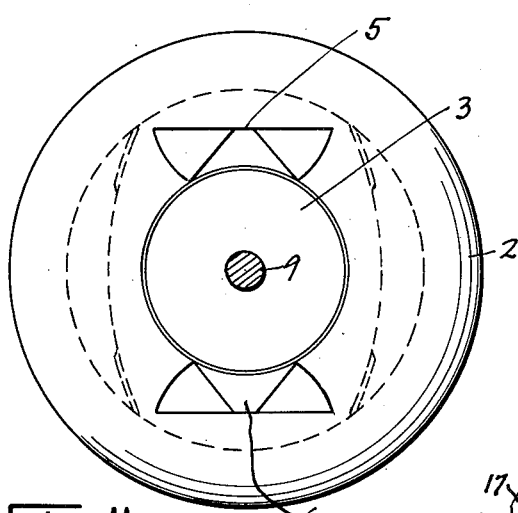
Fig. 11.
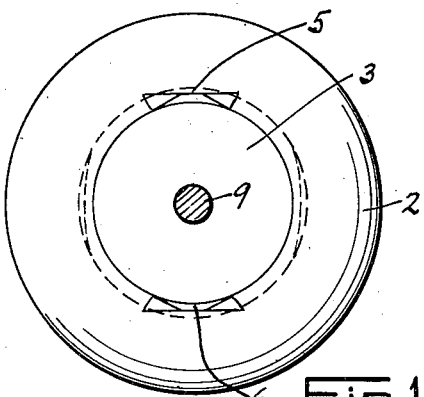
Fig. 13.
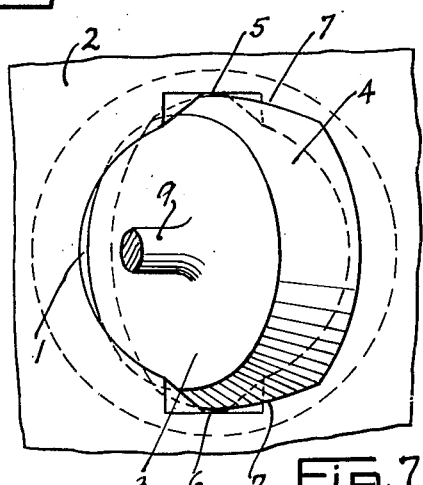
Fig. 7.
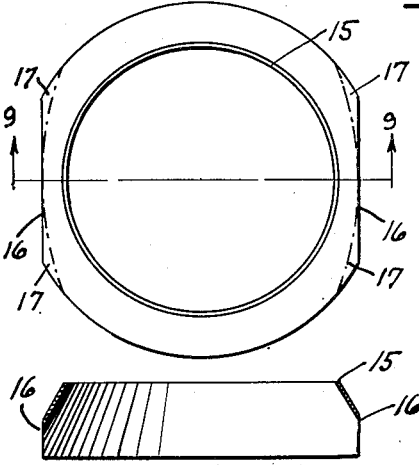
Fig. 8.
Fig. 9.
INVENTOR.
CHARLES W. THORNHILL.
BY J. Vincent Martin
Ralph Browning
ATTORNEYS Patented Aug. 29, 1950

2,520,864

UNITED STATES PATENT OFFICE 2,520,864

CLOSURE FOR PRESSURE VESSELS

Charles W. Thornhill, Houston, Tex., assignor to Thornhill-Craver Company, Houston, Tex., a corporation of Texas Application May 29, 1945, Serial No. 596,549

7 Claims. (Cl. 220—25)

1

This invention relates to a closure joint for any type of pressure vessel or for the end of a header or pipe under pressure, and has for its general object the provision of a joint which will tend to seat itself more tightly under pressure rather than tending to loosen as is the case with the usual closure which is applied from the outside of a pressure vessel.

The invention has further reference to novel arrangements for manipulating a closure member into and out of closing position with respect to such pressure vessel or the like.

The invention has for one of its objects the provision of an improved device whereby a perfectly tight joint between the material of a closure member and the material of a pressure vessel may be obtained without the aid of any packing material, while at the same time the closure member may be readily introduced into position from the exterior of the vessel.

The invention has for a further object the provision of a thin metal ring or gasket for the closure member, which gasket, in the event the mating surfaces on the closure member and the aperture are initially imperfectly fitted or become so due to wear or corrosion, serves to seal the joint between the closure member and the aperture.

Various other advantages, objects and characteristics of the invention will become apparent from the following description taken in connection with the accompanying drawings, in which:

Figure 7 is a plan view showing the aperture which is to be covered and the manner of introducing the closure;

Figure 8 is a plan view of the gasket employed on the closure;

Figure 9 is a vertical sectional view on the line 9—9 of Figure 8;

2

Figure 10 is a modified form of the invention in which vessels operating under very high pressures are involved and in which the angle of the seating surfaces with respect to an axis of the closure member is very great;

Figure 11 is a plan view taken on the line 11—11 of Figure 10;

Figure 12 is a modified form of the invention in which vessels operating under lower pressures are involved and in which the angle of the seating surfaces with respect to an axis of the closure member is much less than in Figure 10; and Figure 13 is a plan view taken on the line 13—13 of Figure 12.

Referring first to the form illustrated in Figures 1 to 9 inclusive, the opening 1 in the pressure vessel 2 in which the closure 3 is to be seated is circular and tapered upwardly and inwardly from the inside of the vessel toward the outside, or from the high pressure side toward the low pressure side, and the closure 3 is similarly formed with a tapering edge 4.

Figure 1:
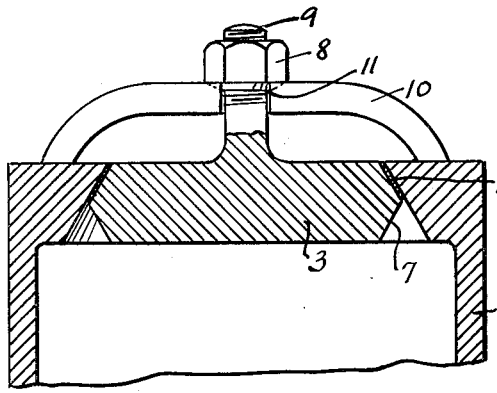
Figure 1 is a vertical sectional view, partly in elevation, of a pressure vessel having an opening therein and a closure therefor constructed in accordance with this invention.
Figure 2:
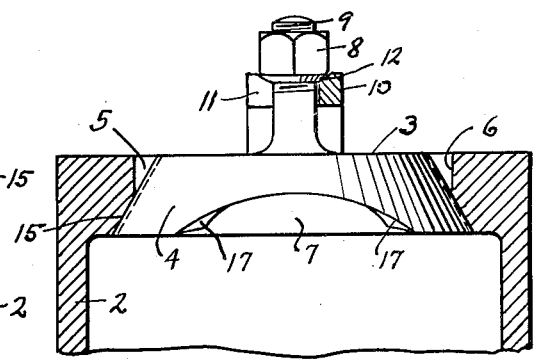
Figure 2 is a vertical sectional view, partly in elevation, taken at a right angle to Figure 1.
Figure 5:
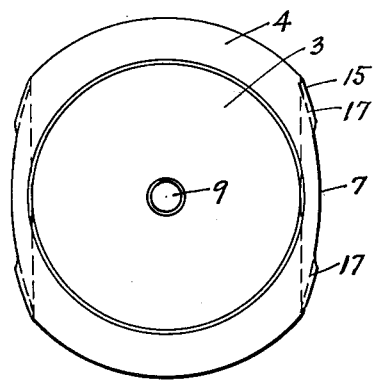
Figure 5 is a plan view of the closure member of Figures 1 and 2.
Figure 3:
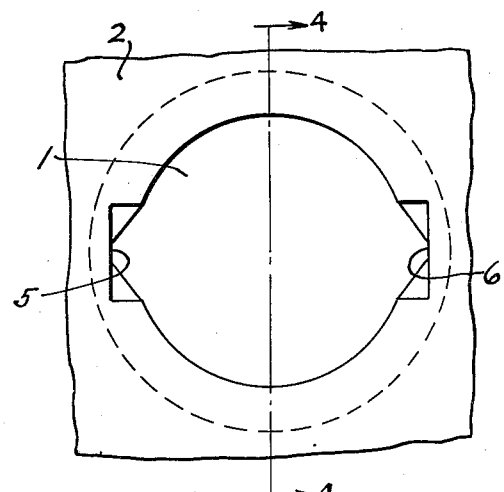
Figure 3 is a plan view of Figure 2, omitting the closure member.
Figure 4:
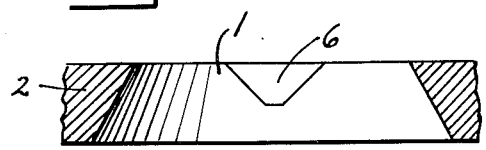
Figure 4 is a sectional view taken on line 4—4 of Figure 3.
Figure 6:
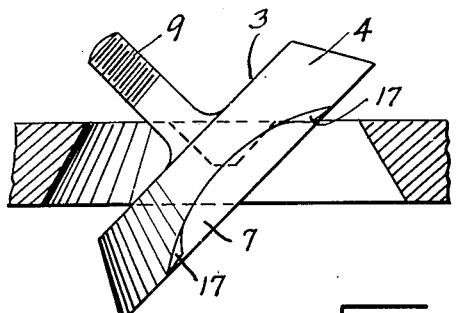
Figure 6 is a vertical sectional view, partly in elevation, showing the aperture which is to be covered and the manner of introducing the closure.

However, at diametrically opposite points of the opening 1, see Figure 3, there are cut out portions or notches 5 and 6, the notches being so controlled that they cut away substantially one-half of the seating surface of that portion of the tapered opening within the zone of the notches. The closure member 3 is cut away by slicing off or removing a flattened portion 7, as indicated very clearly in Figures 1, 2, 5 and 6; this portion being of such extent that it cuts away substantially one-half of the axial length of the seating surface 4 of the closure member. This arrangement provides a combination in which the minimum overall dimension of the closure member 3 is substantially the same as the maximum inner dimension of the opening in the vessel, so that the closure member may be turned sideways as indicated in Figures 6 and 7, and inserted through the opening, though without the cutaway portions 7 and notches 5 and 6, it could not be so inserted. The closure member is then turned so that the notches and cutaway portions do not register with each other but are at substantially right angles to each other as indicated in Figure 2, and the closure member is then drawn into seating engagement with the pressure vessel and held in place by a nut 8 on stem 9, the nut engaging the face of a bridge 10 that bridges the outside of the opening 1. In Figure 2, there is provided in the bridge 10, a notch 11, which receives the stem 9, so that the bridge may be placed about the stem 9 without removing the nut 8. There is a slight depression 12 in the bridge in the region where the nut 8 contacts the bridge, so that the surface of the nut 8 will be enabled to rock therein and be retained in its proper position on the bridge.

In the form of the invention shown in Figures 1 to 9 inclusive, there is also provided between the two seating surfaces a gasket 15, this gasket being illustrated in Figures 8 and 9. This gasket fits over the closure member 3, as shown, and is provided with cut-away portions 16 corresponding to those of the closure member 3, but by reference to Figure 9 it will be seen that the cut-away portions are made parallel to the vertical axis, whereas, by reference to Figure 1, it will be seen that the cut-away portions on the closure member are made at an angle to the vertical axis of the closure member, with the result that the gasket will have small corner portions 17, see Figures 2 and 8, that may be turned under adjacent the ends of the cut-away portions 7, for the purpose of holding the gasket in place on the member 3. The member 3 may be used with or without the gasket, depending upon the circumstances of use, such as the finish or condition of the mating surfaces, the type of fluid to be sealed against, the involved pressures and temperatures in the vessel, etc. But, if a gasket is employed it should be made of gasket material softer than either the closure member metal or the opening seat metal, so that any damage such as scoring or the like would take place on the gasket rather than on either of the above elements, and the gasket should be easily replaceable.

In Figures 10 and 11, there is shown a modified form of the invention in which vessels operating under very high pressures are involved and in which the angle of the seating surfaces with respect to the vertical axis of the closure member is very great. This form might be used where very high pressures are involved, so as to prevent excessive hoop tension in the metal surrounding the opening of the vessel. As shown, the metal may be thickened as at 20, and also rounded as indicated to assist in taking this hoop tension. Other structural features shown in Figures 10 and 11 are the same as those found in Figures 1 to 9 inclusive.

Where vessels capable of dealing with lower pressures are involved, the form of the invention shown in Figures 12 and 13 may be employed. The angle of the seating surfaces may be much less, as indicated, to obtain a higher seating pressure, and the depth of the notches and the amounts of metal cut away from the closure element will be very substantially less than in the forms previously described, even though the opening in the vessel which is left when the closure element is removed is exactly the same as in the other forms.

It is to be noted that by making the notches V-shaped as indicated in the various figures of the drawings, the necessity for tilting the closure element to substantially right angles to the plane of the opening, is eliminated, and the closure may be inserted when it is on a much smaller angle, say 45°, as indicated in Figures 6 and 7. These notches in the member 2 are adjacent the aperture and each of the notches intersect the seat along lines which, when viewed in elevation along a radius of the seat surface, substantially intersect at the narrowest portion of the seat. (See Fig. 4.) Due to the undercut character of the surface 7 on the closure, the closure will pass through the notches, because the closure at the undercut is V-shaped in cross section along a plane including or parallel to the axis of the tapered seat of the closure. With this character of notch at the aperture and this undercut on the closure, the narrowest portion of the aperture seat may be substantially one-half the maximum width of the aperture seat.

It is to be noted that one of the important aspects of this invention resides in the fact that the tapered circular seat lends itself to easily calculated seat pressures. For low pressures a smaller angle will multiply the total force on the plug to any desired seat pressure whereas for higher pressures a larger angle will decrease hoop tension in the pressure vessel around the aperture. Taking into account the total area of the plug exposed to pressure, and the pressures to be sealed against, and the area of the seating surface, the correct angle of the seating surfaces to obtain the proper seat pressure per square inch may be readily calculated by well known principles of machine design.

While the invention has been described with respect to certain preferred constructions, it will be understood by those skilled in the art after understanding the invention, that various changes and modifications may be made without departing from the spirit and scope of the invention and it is intended therefore in the appended claims to cover all such changes and modifications.

Having described my invention, I claim:

1. In a structure of the character described, a member adapted to hold a pressure differential and having a circular aperture therein the edge of which is tapered from the high pressure side toward the low pressure side of the member to provide a tapered closure seat, a circular closure having its edges tapered to provide a tapered seat complementary to the tapered seat in the aperture, the edges of said aperture and closure being each cut away at diametrically opposite points to cut away a portion only of the width of the tapered seat in each instance and provide a maximum dimension for said aperture slightly greater than the maximum dimension across the cutaway portions of said closure, whereby said closure may be passed through said aperture and then seated therein with cutaway portions of the aperture and closure out of register, and a thin gasket of relatively soft material covering and removably secured on the seating surface on said closure independently of the apertured member, and having a dimension at the smallest transverse dimension of the closure provided by the cut away portions thereof less than the maximum dimension of said aperture provided by the cut away portions thereof to permit the gasket to be passed through the aperture with said closure while so secured to said closure.

2. In a structure of the character described, a member adapted to hold a pressure differential and having a circular aperture therein the edge of which is tapered from the high pressure side toward the low pressure side of the member to provide a tapered closure seat, a circular closure having its edges tapered to provide a tapered seat complementary to the tapered seat in the aperture, the edges of said aperture and closure being each cut away at diametrically opposite points to cut away a portion only of the width of the tapered seat in each instance and provide a maximum dimension for said aperture slightly greater than the maximum dimension across the cutaway portions of said closure, whereby said closure may be passed through said aperture and then seated therein with the cutaway portions of the aperture and closure out of register, a gasket of relatively soft material covering the seating surface on said closure, and means for removably securing said gasket in place on said closure independent of said apertured member, said closure with gasket secured thereon being of such dimensions as to be insertable through said aperture at its said maximum dimension.

3. In a structure of the character described, a member adapted to hold a pressure differential and having a circular aperture therein the edge of which is tapered from the high pressure side toward the low pressure side of the member to provide a tapered closure seat, a circular closure having its edges tapered to provide a tapered seat complementary to the tapered seat in the aperture, the edges of said aperture and closure being each cutaway at diametrically opposite points to cutaway a portion only of the width of the tapered seat in each instance and provide a maximum dimension for said aperture slightly greater than the maximum dimension across the cutaway portions of said closure, whereby said closure may be passed through said aperture and then seated therein with the cutaway portions of the aperture and closure out of register, a gasket of relatively soft material for covering the seating surface on said closure and removably secured to the closure independently of the apertured member, said gasket being cut away at diametrically opposite points to provide a minimum dimension at the smallest transverse dimension of the closure provided by the cut away portions thereof not greater than said smallest transverse dimension of the closure.

4. A gasket adapted for use in conjunction with a closure of the character described having a frusto-conical seating surface with portions cut away at two diametrically opposed positions, said gasket comprising a frusto-conical sheet metal body having diametrically opposed portions cut away adjacent its outer edge along planes substantially parallel to the axis of its conical surfaces.

5. A gasket adapted for use in conjunction with a closure of the character described having a frusto-conical seating surface with portions cut away at two diametrically opposed positions, said gasket comprising a frusto-conical body of formable sheetlike material having diametrically opposed portions cutaway adjacent its outer edge along planes substantially parallel to the axis of the conical surfaces.

6. A gasket adaptable for use in conjunction with a closure of the character described having a frusto-conical seating surface with portions cut away at two diametrically opposed positions, said gasket comprising a frusto-conical body of sheetlike deformable material having its outer edge formed with two diametrically opposed cut away portions at its outer edge, said gasket having extensions of the material of the gasket at the outer most edge of the gasket but spaced from said cut away portions adapted to be bent about a closure to secure the gasket thereto in service.

7. In a structure of the character described, a member adapted to hold a pressure differential and having a circular aperture therein the edge of which is tapered from the high pressure side toward the low pressure side of the member to provide a tapered closure seat, a circular closure having its edges tapered to provide a tapered seat complementary to the tapered seat in the aperture, the inner edge of said aperture seat and the outer edge of said closure seat being each cut away at diametrically opposite points to cut away a portion only of the width of the tapered seat in each instance and provide a maximum dimension for said aperture slightly greater than the maximum dimension across the cut away portions of said closure, the pressure side of the closure being under cut at the cut away portion so that the edge of the closure in cross section at the cut away portion is V-shaped, the cut away portions in the edge of the aperture providing notches in the member adjacent the aperture, each of said notices intersecting the seat along lines which, when viewed in elevation along a radius of the seat surface, substantially intersect at the narrow portion of the seat and diverge therefrom toward the low pressure side of the aperture whereby said closure may be passed through said aperture and then seated therein with the cut away portions of the aperture and seat out of register.

CHARLES W. THORNHILL.

REFERENCES CITED

The following references are of record in the file of this patent:

UNITED STATES PATENTS

| Number | Name | Date |
|---|---|---|
| 542,431 | Vallat | July 9, 1895 |
| 2,156,166 | Smith | Apr. 25, 1939 |
| 2,271,411 | Thwaits | Jan. 27, 1942 |

FOREIGN PATENTS

| Number | Country | Date |
|---|---|---|
| 3,143 | Great Britain | of 1891 |
| 14,377 | Great Britain | July 12, 1899 |
| 18,069 | Great Britain | of 1897 |
| 51,784 | Germany | May 5, 1890 |